United States Patent

Rees

[15] 3,660,605

[45] May 2, 1972

[54] PULSE CODE MODULATION SWITCHING SYSTEM UTILIZING TASI

[72] Inventor: Frederick Henry Rees, London, England

[73] Assignee: International Standard Electric Corporation, New York, N.Y.

[22] Filed: Apr. 15, 1970

[21] Appl. No.: 28,593

[52] U.S. Cl. ..................179/15 AS, 179/15 AQ, 179/15 AT, 179/18 J

[51] Int. Cl. ..........................................................H04j 5/00

[58] Field of Search .............179/15 AS, 15 AQ, 15 AT, 18 J

[56] References Cited

UNITED STATES PATENTS

| | | | |
|---|---|---|---|
| 3,520,999 | 7/1970 | May | 179/15 AS |
| 3,424,868 | 1/1969 | Saal | 179/15 AS |
| 3,510,596 | 5/1970 | Lyghounis | 179/15 AS |

OTHER PUBLICATIONS

The Bell System Technical Journal, " Engineering Aspects of TASI", Bullington et al, Vol. 38, pp. 353-364, March 1959.

*Primary Examiner*—William C. Cooper
*Assistant Examiner*—David L. Stewart
*Attorney*—C. Cornell Remsen, Jr., Walter J. Baum, Percy P. Lantzy, J. Warren Whitesel, Delbert P. Warner and James B. Raden

[57] ABSTRACT

A telecommunication switching system is provided in which communication connections are set up in a time division multiplex (TDM) manner to convey intelligence by pulse code modulation (PCM). The system utilizes time assigned signal interpolation (TASI) techniques so that during a silent period in a communication connection the communicatees can be disconnected from the multiplex highway, and can be re-connected to said highway whenever a new burst of intelligence commences from either communicatee.

2 Claims, 2 Drawing Figures

Figure 1:
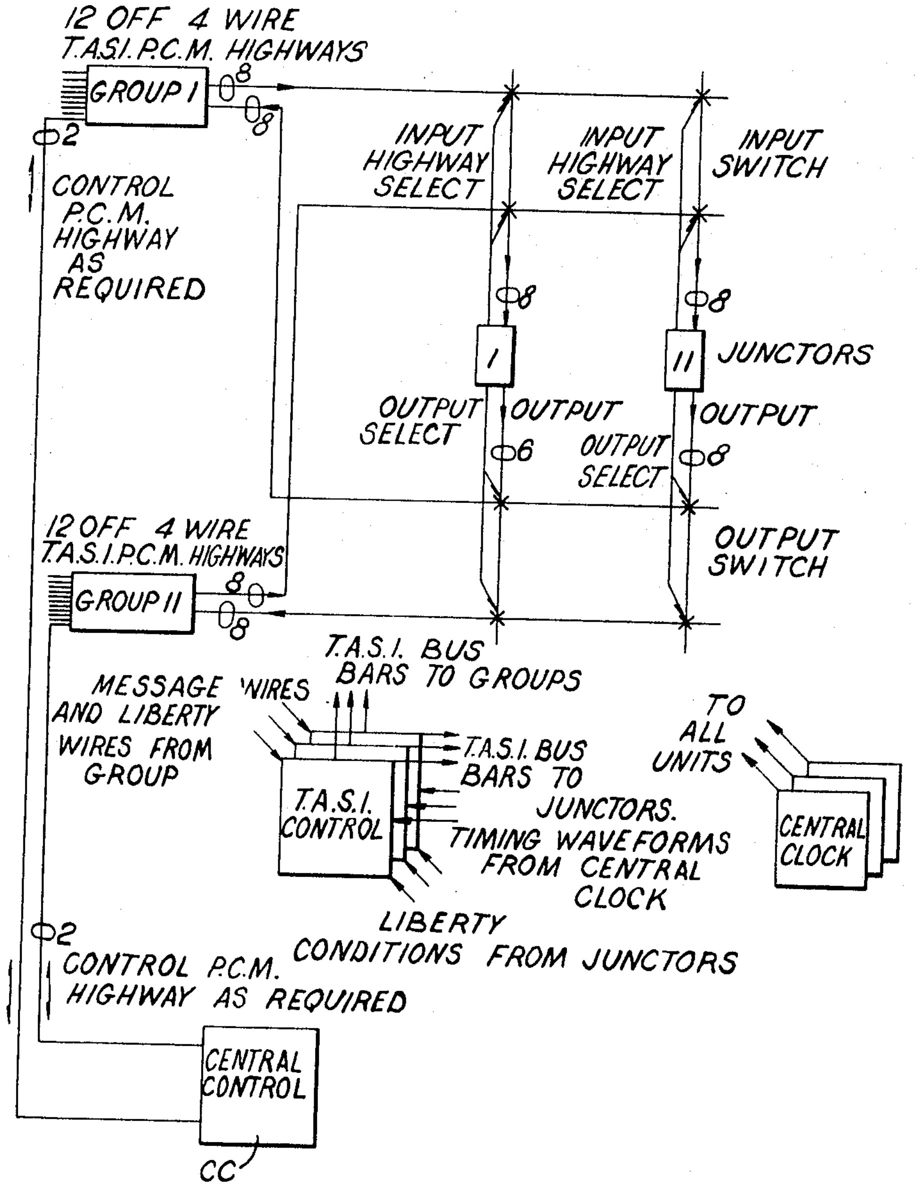

*Inventor*
Frederick Henry Rees
By D. R. Warner
*Attorney*

PULSE CODE MODULATION SWITCHING SYSTEM UTILIZING TASI

This invention relates to telecommunication systems, and especially to such systems in which intelligence is conveyed over time division multiplex (TDM) highways, using pulse code modulation (PCM).

Since such systems economize in line utilization because of the multiplexing used, some increase in complexity of the circuits associated with the multiplex highways as compared with normal terminal equipment can be tolerated. However, it would be useful, if possible, to increase the economy still further by enabling the multiplex highway to carry even more traffic, and it is an object of this invention to effect such an increase.

According to the invention, there is provided a telecommunication system in which communication connections are set up in time division multiplex (TDM) manner with the intelligence to be conveyed in pulse code modulation (PCM) form, and in which time-assigned signal interpolation (TASI) techniques are available, so that during a silent period in a communication connection the communicates can be disconnected from the multiplex highway, being re-connected to said highway whenever a new burst of intelligence from either of the communicatees commences.

An embodiment of the invention will now be described with reference to the accompanying highly schematic FIGS. 1 and 2.

In a telephone system it has been found that a typical speech burst lasts for about 1 second. In a PCM system in which the sampling rate is 8Khz and there are eight bits per sample, such a speech burst may be considered as a data package of 64,000 bits. In data transmission, to print one line on a remote line printer it is necessary to transmit a data package of approximately 1,000 bits. If these data packages are to be transmitted across an integrated PCM network using TASI, it would first be necessary to set up a path across the network, then to send the package, and finally to disconnect the path so that its constituents parts could be used as required for other messages. To do this, a slot or time position would be allocated on suitable links making up the path, and suitable paths across the exchanges involved in the connection.

It is herein assumed that each data package of the same connection uses the same links, i.e. multiplex highways, but that the time position used on these links and the paths used across the exchanges are, in the case of speech bursts, chosen afresh for every speech burst. The speech paths used for the two directions of transmission are separately controlled so that normally a path is only set up in one direction at a time. However, there will be times when both speakers are talking and then both directions will cause path setting. A path across the network is disconnected if "zero code" is received on that path in four successive frames. "All ones" code is used as a hold connection indication. This special use of the "all zeros" and "all ones" codes reduces the available coding levels to 254, but this has little if any deleterious effect on the PCM coding. An "all zero" or an "all one" code is neither coded by the coder nor decoded by the decoder, i.e. the code is treated as if a zero level were present. For data transmission the "all ones" code is sent before a data package to ensure that a path is made before information is forwarded. A "proceed to send" signal returned indicates that a path has been made and that data may be sent. After a data package has been sent "TASI hold" signal can be sent to to prevent breakdown of the path before the next data package is sent, if this is required.

In a telecommunication system it may happen that the traffic during a large part of the day may not be sufficient to warrant the breaking down of a speech path after each speech burst. In this case, during the relatively slack traffic periods, the disconnect code "all zeros" is not sent between data packages of speech.

The region of greatest attraction for the application of TASI techniques to a PCM system is likely to be on longer routes within an integrated PCM network. Here the savings in transmission are greater than in other types of PCM systems. For instance, for a nation-wide PCM network in a country of the size of the United Kingdom, there would be group switching centers interconnected by PCM links, and the links between the group switching centers could use TASI techniques, the other inter-exchange links not using such techniques. In such a case the group switching centers would have adapters for conversion between normal or simple PCM and TASI-PCM transmission. In the case of data transmission, the group switching centers would also need store and forward message switching equipment. TASI, PCM highways can also be used to connect the group switching centers to their adjacent district switching centers which latter effecting interconnection between a number of group switching centers. Higher order switching may occur at main switching centers, in which case the links between district and main switching centers and between main switching centers would also use TASI techniques. In such systems, some high speed data packages may be sent through the network without store and forward message equipment. The "all ones" code, i.e. the hold code, may be used as a pulse-stuffing device.

In the example to be described it is assumed that all multiplex highways have 30 slots or time positions available for data packages (as already indicated the term data package embraces the sequence of codes sent for a speech burst or the sequence of codes sent for a portion of digital data), and that up to 510 channels may be assigned to these slots, including 64 speech channels. The multiplex highways are assumed to be 32-slot systems, each slot containing eight bits, the two slots not used for data or speech being used on a multiframe basis for synchronizing signals and for TASI order-wire signals. The latter signals will be mentioned in more detail later.

Data packages, whether representing digital data or speech, originate and terminate on the adapters at the group switching center. When a data package is detected on a channel at one of these adapters, a slot in one of the PCM links outgoing from the switching center is assigned to the channel on which the data package was detected, and a message is sent on the TASI order wire of this highway to indicate that the channel $w$ has been assigned to slot $x$ on this highway.

The highway terminates at the appropriate one of the exchanges on a group equipment which serves, in the present example, 12 highways. In the group equipment a translation code is stored either in a temporary memory or in a semi-permanent memory. This temporary storage is associated with connections which are desired to be made, or broken down, under automatic control, i.e. telephone conversations and some of the data (digital data) connections. Other connections, such as low-usage data connections, may require that data be sent from one switching center to another through the network with an extremely fast set-up time (of the order of milliseconds) but remains as connections which occupy no slot position for most of the time. In such a case semi-permanent storage is assigned to the channel translations. A terminological differentiation is herein made between a path and a connection, a connection meaning that a translation in a group equipment indicates that data packages arising on one particular channel must be routed across the exchange to another particular channel, whereas the path is only made as and when required. Two translations are required for a four-wire connection, one for each direction. At this point it should be mentioned that, as usual a connection in which separate paths are used for the "go" and "return" signals is called a four-wire connection, although the actual connections may involve only one wire and an earth return.

A translation code in the input group equipment specifies that channel $w$ on the highway concerned has been connected to channel $z$ of out-going group A, highway B. A TASI, PCM exchange must, on receipt of a TASI "order wire" instruction ensure that there is a free slot on the required highway of the outgoing group over which the connection is to be set up that a path is set up across the office between the incoming slot and the selected outgoing slot within a short space of time, typically 1 millisecond, and that an order wire message is sent over the outgoing-highway of the group specifying that a particular channel has been assigned to the selected slot.

Referring now to FIG. 1, which shows schematically a switching center using TASI techniques of the sort referred to above. At the left hand side, there are a number of group equipments, of which those for group 1 and group *n* are shown. Each of these group equipments serves 12 four-wire PCM highways, over which PCM signalling occurs in TASI form. From each of the group highways a control PCM highway extends to the central control equipment CC. This may be duplicated or triplicated in the interests of security. The PCM switch proper is of the so called space-time-space type using a coordinate matrix of electronic gates.

Figure 2:
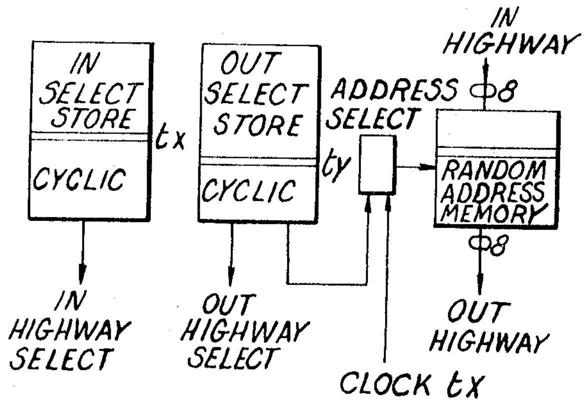

The junctors shown as little blocks in FIG. 1 are shown in slightly more detail in FIG. 2, from which it will be seen that they include two main stores, an in select store and an out select store, and there is also random access memory used in conjunction with the highways. Each junctor serves a highway from the switch on the incoming side of the exchange and also a highway or highways on the outgoing side of the exchange. Each of these highways can be connected to any one of the incoming or outgoing highways, under control of the information in the memories of the junctors. Thus considering one of the junctors, it scans the two highways to switches which it serves cyclically. It will be appreciated that storage is necessary so that data can be retained in a junctor when the channels to be interconnected occupy different time positions on their respective highways. This, of course, is the purpose of the random access or random address memory of FIG. 2.

In the junctors, a random address store cell is assigned to each incoming channel time of the junctor. The information reaching the junctor at time $t_x$ on the parallel input wires is recorded in row $x$. Then if there is a complete set, i.e. 384, of random address cells, there is no need to specify the cell to which the information is destined in the cyclic in-select store $t_o$. However, in out select store cell $t_y$, it is necessary to specify from which random address cell information is to be extracted to be sent to the out highway of the junctor. This information in the out select store is also read out cyclically. The channel times are each divided into two parts, in the first of which information incoming to the junctor is directed to the selected random access store cell for waiting and in the second part an address store cell is selected according to information in the junctor's out select store.

Although the above method is the preferred one, there are two alternatives. In the first, the number of random address cells is limited to the maximum number of paths expected at any time in one of the junctors. This can be cheaper since fast-acting random access memory is costly, whereas cyclic storage is cheaper. Thus by providing an additional cyclic memory to specify the input random address cell address, one can provide only enough random address storage as is needed to handle the traffic. In the second alternative, the out select store has the cyclic addressing of the random address memory and the in select store has the storage needed to select the random address cells in a random manner. This storage is cyclic, and would form part of each row $t_x$.

As an example we will consider the switching of 20,000 TASI speech channels and 100,000 low occupancy data channels on 288 multiplex highways assigned to 24 groups. That is, in FIG. 1, $n = 24$. This example shows that the network is practical and that the economical switching of a large number of channels in the short time required for TASI, PCM operation is possible. It is assumed that a number of speech connections of the order of 5,000 may be in affect at one time, and that it is desired to be able to connect paths across the exchange at a rate of up to 80,000 paths per second, one path connected per call per direction per 250 milliseconds.

The switching should be as simple as possible to facilitate fast path search and connection. The switching mode is as shown in FIG. 1, which shows a space-time-space (STS) type of parallel switching operating at 3.072MHz. The term parallel switching means that parallel transmission is used in the switching itself whereas serial transmission can be used over the inter-exchange highways. There serial-parallel and parallel-serial conversion is needed in the group equipment. Further, the highways within the switching network can be "-super-multiplex" channels, with a number of inter-exchange links having their bits interleaved on the within-switch links.

The principle of operation is that to provide a cyclic memory for the input control, i.e. the in select store in FIG. 2, which specifies to which group input highway the junctor inputs are connected and the clock time specifies to which portion of the random access memory in the junctor the information is routed. This principle as set out assumes one random access cell per channel time per junctor. This random access memory can use integrated circuit units of the so called scratch pad type. A cyclic memory is also used for output control, and this controls the destination of the output of the junctor and specifies from which random access portion of the random access memory the information is to be extracted.

A unidirectional path across the exchange is specified by a row $t_x$ in the in-select store of a junctor memory, together with a row in the output-selectors store $t_z$ of the same junctor. Both cells specify the same random access memory address. That is, when the in-select store in its cyclic operation reaches the row $t_x$ the incoming highway is connected to the portion of the random access memory identified by the address indicated by the clock, so that the PCM combination is temporarily stored. Then on the next occasion on which the row $t_y$ of the out-select store is read, the address therefrom passes via the address select unit to the address to the random address memory, where it causes read-out of the stored information to the outgoing highway. It would also be possible for the out select time to determine which row in the random access memory is addressed for path setting — this is to some extent an inverse of the above-described method.

The input group equipments receive TASI order wire messages, translate them, store the results, and forward the result every two TASI cycles to the TASI control over the connections indicated schematically in FIG. 1. When such forwarding has occurred, the group equipment which has done the forwarding erases the result from its memory after it has received confirmation from the TASI control that a path has been selected. In the TASI control logic, there being three levels of logic for security, the TASI messages are transferred to an input store on each level according to $t_x$ time (one store for each $t_x$ value) while the previous messages are being processed If $t_x$ is occupied the message is ignored on the TASI cycle.

In phase 1 of the TASI cycle the message from row $t_x$ of the input store of the group equipment is transferred at time $t_x$ to a search store, together with the input availability condition of all the junctors at that time. No TASI messages are sent from group to TASI control during this phase. Each message passed to the search stores is recorded in a search store specifically allotted to the highway time of the output highway required. In the present example there are 10 such stores per highway number and there are 12 highway numbers because information from 12 highways is interleaved to form a group highway of eight parallel paths.

During phase 2 a search is made for a suitable $t_y$ time, using output availability information from the junctors and the output group highways. This phase starts at a slightly different time for each store and lasts for a minimum duration of one frame (one frame being one complete cycle of the multiplex system). If a suitable time $t_y$ is found, the bits corresponding to junctors available at $t_y$ and $t_x$ are set to one at the end of this phase.

Phase 3 is a period of random selection of junctors. A junctor can only have one cell set up to the same highway number time during one TASI cycle. Logic circuit precautions taken in phases 2 and 3 prevent this from happening, such precautions being in accordance with standard practice in logic circuit design. Also in phase 3, logical precautions are taken to ensure that the same output highway channel is not specified for two calls at the same $t_y$ time. This latter precaution can be effected by using well known lock-out techniques.

During phase 4, messages are sent out to junctors and group equipments with the information necessary for the establishment of the connection, removal of message information from the input group TASI store occurs, and TASI order wire messages are sent out as required over the output highway.

During phase 1 of the next cycle the messages received during phase 4 are used to set up the paths. During this phase these messages inhibit any time slot $t_x$ availability pulses associated with the messages. Release of paths is carried out automatically in the junctor on reception of "all zero" codes in four successive frames.

Information necessary for a speech or temporary data connection or release is forwarded over data channels (fixed) of the system. These data channels each terminate on inputs to the central control of their exchange. The writing in of the translation codes of a temporary nature is under the control of the central control of the exchange.

In the above description there have been several references to the TASI order wire signalling, which uses a system in which once every two frames (each of 125 microseconds) a TASI order wire instruction is received. This instruction consists of the eight bits in the same time positions in two successive channels, but is treated by the equipment which received it as if it was a single 16 bit instruction. The structure of the order wire instruction is that bits one to nine give the channel number to which the instruction relates, bits 10 – 14 specify the number of the slot within the channel, and bits 15 and 16 are parity bits.

Every fourth frame the same two channels are used for a 16 bit synchronization code. Also every fourth frame we have an ordinary order wire of 16 bits which is forwarded to the central control along a signalling wire. The ordinary order wire information from the 12 highways of the group is gated on this signalling wire at different channel times from each other. Inter-exchange signalling uses this order wire. Thus the multiframe structure of the special channels includes in frames 1 and 3 for TASI control, frame 2 for synchronization and frame 4 for a normal order-wire control. It should also be noted that the pair of channels which are used on a multiframe basis for control are different from each other for the various channels of the same group.

I claim:

1. The method of transmitting messages in a TDM manner for conveyance of information in PCM by the use of time assigned signal interpolation within a system having group equipment serving a plurality of input multiplex highways and a plurality of junctors for completing paths from the input highways to output highways, the method comprising the steps of (1) transferring an address message from a row in a memory in the group equipment, the row being representative of a particular time slot on a highway, the transfer being made to a search store in a common control unit, (2) transferring from the junctors to the search store signals representing the input availability of junctors usable at that time, (3) recording each address message in a search store specifically allotted to the time slot of the output highway for which the message is intended (4) searching for a suitable output highway time slot using junctor availability information and output availability information, said searching starting at a slightly different time for each store, (5) maintaining said last-mentioned search in effect for a minimum duration of one complete cycle of the multiplex system, (6) transmitting from the search store a signal comprising an all ones signal to an available junctor for the purpose of allotting an input highway time slot and an output highway time slot on the available junctor, (7) locking the allotted highway time slot from use in other connections, (8) sending out address messages from said search store to an input select store and an output select store in the available junctor to establish a connection through the junction, (9) removing the last mentioned address messages from the common control following storage in the junctor memories, (10) using the messages sent out to the junctors for setting up paths for the next multiplex cycle, and (11) sending out over the output highwasy signals indicating the presence of TASI signals.

2. The method of claim 1, wherein the TASI method outlined is used only for speech transmission and not data, and the further step of sending an "all zeros" signal to said common control preceding a speech communication to enable the TASI disconnection, and for supplying an "all ones" signal to said control to prevent interference of TASI with any data transmission.

* * * * *